Patented Mar. 31, 1936

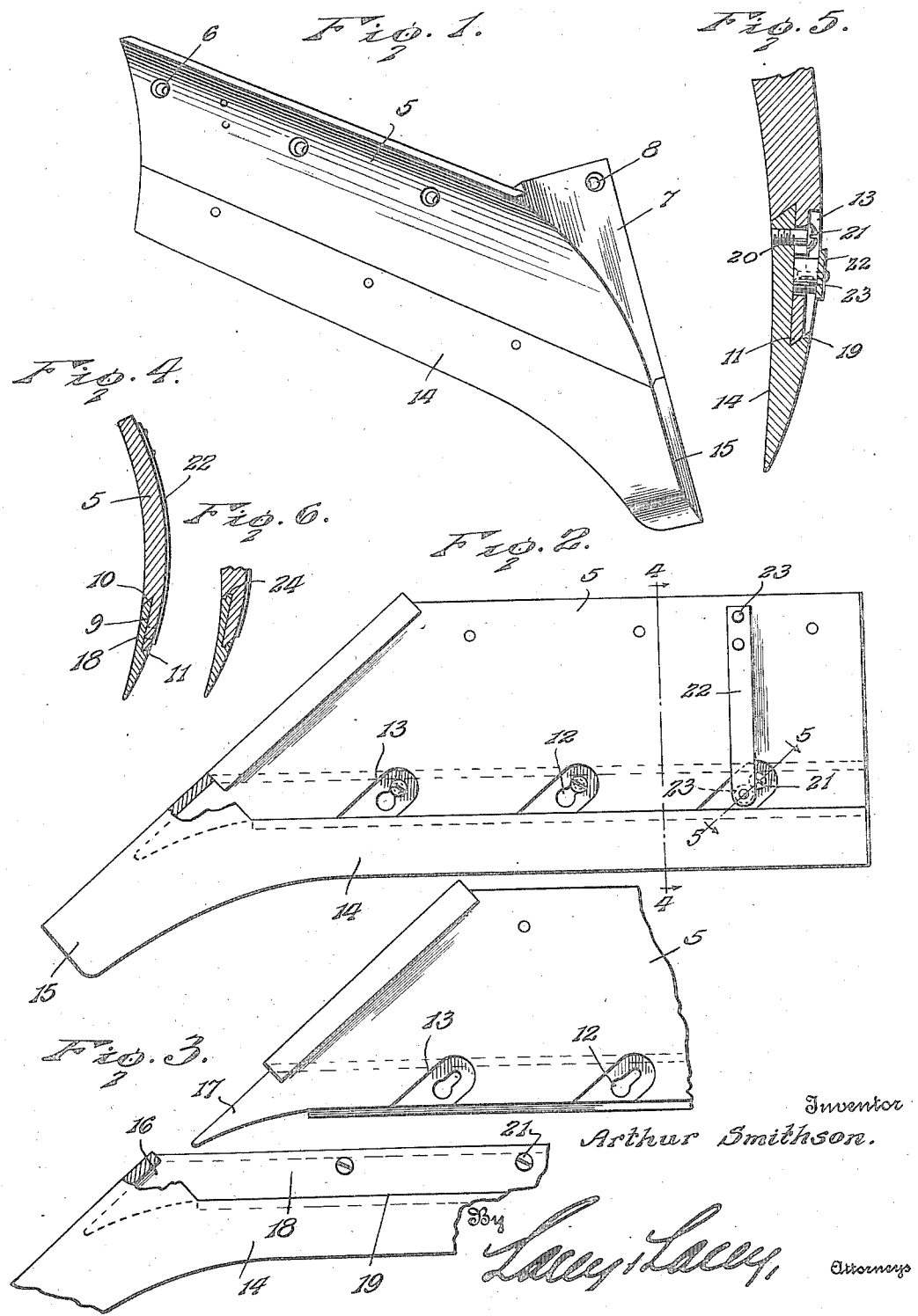

2,036,102

UNITED STATES PATENT OFFICE 2,036,102

DETACHABLE CUTTER AND POINT FOR PLOWS

Arthur Smithson, Glenwood, Minn.

Application June 25, 1935, Serial No. 28,344

2 Claims. (Cl. 97—125)

This invention relates to plows, and more particularly to a combined cutting edge and point for detachable connection with a plow share.

The object of the invention is to provide a comparatively simple and thoroughly efficient device of this character in which the cutting edge and point are of integral construction and provided with means whereby they may be quickly and conveniently attached to a plow share or removed therefrom to permit resharpening or replacement in case of damage thereto.

A further object of the invention is to provide the plow share and cutting edge with interfitting parts, one of which is formed with spaced diagonally disposed keyhole slots and the other with headed pins adapted to enter the slots when said parts are assembled for detachably holding the cutting edge and point in proper position on the plow share.

A further object is to provide a single locking device mounted on the plow share and adapted to engage one of the headed pins for simultaneously locking the heads of all of the pins in their respective slots.

A still further object of the invention is generally to improve this class of devices so as to increase their utility, durability, and efficiency.

In the accompanying drawing forming a part of this specification and in which similar numerals of reference indicate corresponding parts in all the figures of the drawing, Figure 1 is a perspective view of a conventional plow share equipped with a detachable cutting edge and point constructed in accordance with the present invention.

Figure 2 is a side elevation looking at the inside of the plow share.

Figure 3 is a similar view showing the parts separated and in position to be assembled.

Figure 4 is a vertical sectional view taken on the line 4—4 of Figure 2.

Figure 5 is an enlarged detail sectional view taken on the line 5—5 of Figure 2.

Figure 6 is a detail vertical sectional view showing a modified form of joint.

The plow share 5 may be of any approved or conventional form and is provided near its upper edge with countersunk openings 6 through which fastening bolts may be inserted to secure the share to the mold board in the usual manner. The working end of the plow share is provided with an attaching lug 7 to which the land slide may be secured by a bolt or similar fastening device adapted to pass through an opening 8. The forward or concave face of the plow share 5 near the lower longitudinal edge thereof is cut away to form a seating recess 9 having an undercut wall 10, and the lower longitudinal edge of the plow share at said seating recess is inclined or beveled at 11 to conform to the inclination of the under-cut wall 10, as best shown in Figure 4 of the drawing. The walls of the seating recess 9 are formed with spaced diagonally disposed keyhole slots 12 and the convex face of the plow share is formed with shallow depressions 13 surrounding the keyhole slots and opening through the lower edge of the share 5, as best shown in Figure 5 of the drawing. Detachably secured to the plow share 5 is a cutter 14 terminating at its forward end in a forwardly and downwardly extended plow point 15, there being a socket 16 formed in the plow point and adapted to receive a correspondingly inclined lug 17 formed on the plow share. The upper portion of the cutter 14 is cut away to form a longitudinally disposed attaching lip 18 adapted to fit within the seating recess 9 of the plow share, said cutter at its junction with the lip being grooved to form an under-cut lip 19 corresponding to the inclination of the edge 11 and adapted to receive said edge 11 when the parts are assembled. Extending laterally from the attaching lip 19 are spaced pins 20 having enlarged heads 21 of a size to fit within the large ends of the keyhole slots 11 so that when the cutter is positioned on the plow share and a slight longitudinal movement imparted to the cutter, the shanks of the pins will enter the small portions of the keyhole slots and clamp the lug 17 within the socket 16. Secured to the convex face of the plow share 5 is a locking member 22 preferably in the form of a flat spring, the upper end of which is rigidly secured to the plow share by suitable fastening devices 23, while the lower or free end thereof is provided with a locking lug 23' adapted to fit in the large end of the adjacent keyhole slot 12 so as to automatically lock all of the pins within their respective keyhole slots and thus prevent accidental detachment of the cutter.

In applying the combined plow point and cutter to a plow share, the lug 17 is inserted in the socket 16 and in this position the heads 21 of the pins will be received in the large ends of the keyhole slots. By then imparting a slight longitudinal movement to the cutter, the shanks of the pins will ride within the small ends of the keyhole slots and in this position the spring will automatically force the lug 23' within the large end of the adjacent keyhole slot and thereby automatically lock the cutter in position on the plow share. In order to remove the cutter it is merely necessary to exert a slight lateral pressure on the lower end of the spring 22 to flex it outwardly until the locking lug clears the head of the adjacent pin. The cutter is then moved longitudinally until the heads 21 register with the large ends of the keyhole slots, in which position the cutter may be easily removed from the plow share, as will be readily understood. In Figure 6 of the drawing, there is illustrated a modified form of joint in which the opposite ends of the seats instead of being inclined or undercut are provided with stepped joints 24 and it will be understood that this stepped joint may be used instead of the beveled or undercut joint, if desired.

It will also be understood that the combined cutting edge and point may be made in different sizes and shapes to fit any style or type of plow share without departing from the spirit of the invention.

Having thus described the invention, what is claimed as new is:

1. A plow share having its lower portion cut away to form a seat, there being spaced diagonally disposed substantially keyhole shaped slots formed in the plow share at said seat, a combined cutter and plow point having its upper portion cut away to form an attaching lip adapted to fit within the seat of the plow share, headed pins extending laterally from the cutter and adapted to enter adjacent keyhole slots, a spring strip having one end portion rigidly secured to the plow share, and a locking lug carried by the other end portion of the spring strip and projecting inwardly therefrom and adapted to enter one of the keyhole slots and bear against the head of the adjacent pin for locking all of said pins within their respective slots.

2. A concavo convex plow share having its concave side at the lower portion thereof cut away to form a seat defining an undercut wall, there being spaced diagonally disposed keyhole slots formed in said seat and the material at the convex side of the share being cut away to form depressions surrounding the keyhole slots, a combined cutter and plow point having its upper portion cut away to form an attaching lip adapted to fit within the seat of the plow share and defining an undercut wall adapted to bear against the lower edge of the plow share, headed pins extending laterally from the attaching lip and adapted to enter the keyhole slots, and a resilient locking member consisting of a resilient strip extending vertically against the plow share and having its upper portion secured to the plow share, the lower end of the strip being free and overlapping one of the depressions and provided with a terminal lug adapted to enter the large end of the keyhole slot in the said depression and bear against the head of the pin extending through the said slot for locking all of said headed pins within their respective slots.

ARTHUR SMITHSON.